(12) United States Patent
Torres Martinez

(10) Patent No.: US 6,968,883 B2
(45) Date of Patent: Nov. 29, 2005

(54) MULTI-APPLICATION HEAD FOR FIBRE STRIPS

(76) Inventor: Manuel Torres Martinez, Sancho el Fuerte,21, 31007 Pamplona (ES)

(*) Notice: Subject to any disclaimer, the term of this patent is extended or adjusted under 35 U.S.C. 154(b) by 304 days.

(21) Appl. No.: 10/369,857

(22) Filed: Feb. 20, 2003

(65) Prior Publication Data

US 2003/0171447 A1    Sep. 11, 2003

(30) Foreign Application Priority Data

Mar. 5, 2002    (ES) .................................... 200200524

(51) Int. Cl.$^7$ ............................................. B29C 70/38
(52) U.S. Cl. ...................... 156/433; 156/173; 156/175; 156/425; 156/441; 156/523; 156/574
(58) Field of Search ..................... 156/425, 433, 156/441, 173, 175, 523, 574

(56) References Cited

U.S. PATENT DOCUMENTS

| | | | |
|---|---|---|---|
| 4,696,707 A | | 9/1987 | Lewis et al. |
| 4,699,683 A | * | 10/1987 | McCowin .................... 156/353 |
| 4,790,898 A | * | 12/1988 | Woods ........................ 156/166 |
| 4,867,834 A | * | 9/1989 | Alenskis et al. ............ 156/433 |
| 4,907,754 A | * | 3/1990 | Vaniglia ...................... 242/437 |
| 5,110,395 A | * | 5/1992 | Vaniglia ...................... 156/353 |
| 5,290,389 A | * | 3/1994 | Shupe et al. ................. 156/425 |
| 5,472,553 A | * | 12/1995 | Roberts ....................... 156/353 |
| 5,645,677 A | * | 7/1997 | Cahuzac et al. ............. 156/361 |
| 6,112,792 A | * | 9/2000 | Barr et al. ................... 156/441 |
| 2005/0006521 A1 | * | 1/2005 | Harvey et al. .............. 242/556 |

FOREIGN PATENT DOCUMENTS

| EP | 0333010 | 12/1992 |
|---|---|---|
| ES | 2112088 | 11/1993 |
| ES | 2114413 | 10/1994 |

OTHER PUBLICATIONS

Emmert, W., et al, "R U Reinforcing plastics with robots?" Plastics Engineering, May 1981, pp. 37-46.*

* cited by examiner

Primary Examiner—Jeff H. Aftergut
(74) Attorney, Agent, or Firm—Dennis G. Lapointe

(57) ABSTRACT

Multi-application head for fiber strips, consisting of a spool carrier (1), on which a plurality of spools are attached (2) as suppliers of the application strips (3), which are fed separately into the proximity of the application area (4), where they pass through a feed port, passing through guide combs (5 and 6) which position them according to a collateral distribution and through rollers (7 and 8) which drive each one of the strips (3) towards the application area (4).

7 Claims, 13 Drawing Sheets

US 6,968,883 B2

MULTI-APPLICATION HEAD FOR FIBRE STRIPS

The purpose of the present invention refers to a head designed for the application of fibre strips,—as may be carbon fibre, fibreglass or any other material of those referred to as "composites"—, with which strips, and by means of the compact overlaying of successive layers, laminated pieces are produced, which are used as a construction material in specific applications of the aeronautic, wind and marine industries, among others.

These kinds of heads are referred to by, amongst others, U.S. Pat. No. 4,696,707 of The Ingersoll Milling Machine Company, in addition to the European Patent 0333010 of Cincinnati Milacron Inc. and the Spanish Patents 9302506 and 9402102 that belong to the very same applicant of the present invention.

These heads apply a single strip or band of the material in question, repeating the application successively in lateral progression until the whole width of the specified surface has been covered.

The strips or bands that are applied in this manner may be of considerable width, in order to cover, with a minimum of passes, the entire surface of application, which has the drawback that when the length of the surface to be covered is irregular, for example when the ends are oblique, it is necessary to waste a significant amount of material in each pass of application of a strip, resulting in an excessive cost in wasted material.

Strips may be used of narrow width, whereby less material is wasted on each strip, thus reducing the cost of the material that is wasted, but then the number of passes required is greater, so the actual time of operation increases, thereby reducing performance.

There are solutions involving multi-application heads, whereby with each pass a series of narrow width strips is applied, determining the beginning and the end of each one of them in the application independently of the rest, meaning that there is a significant reduction in the wastage of material, whilst the number of passes that has to be effected is the same as if a very wide band were used.

The heads of this kind that currently exist are, however, very limited in terms of the number of strips that they allow to be applied simultaneously and, in addition, they are stationary, meaning that it is the construction piece that moves by means of a rotary and moveable support; this calls for the setting up of complex and costly facilities, whilst the application is only suitable for rotating pieces.

In accordance with the present invention, a multi-application head is proposed with which to solve these shortcomings in known heads, by means of an apparatus that provides highly advantageous construction and functional features, allowing for the construction of pieces of any kind.

The head proposed by this invention consists of a spool carrier that can hold a large number of spools supplying narrow width fibre strips, which are fed separately into the application area, where they are laid down and jointly occupy an application width, passing through a feed port located upstream the application outlet, where the different strips are driven individually; this maintains them apart until they are applied, at which stage they are laterally bonded to each other.

The feed port comprises two adjacent drag rollers in parallel, by means of which the strips are driven, with guide combs upstream and downstream the passage between these rollers and configured as curved grooves, through which the strips are guided with a separation between their edges that is compensated when they adopt a flat position in the application.

The drag rollers each consist of a cluster of washers that rotate independently, which establish transversely arched edges which correspond reciprocally with the opposing washers on both rollers, with one of the washers of each corresponding pair between the two rollers being power-driven and the other rotating freely; for which according to a preferential embodiment of the invention, half the washers are power-driven on one of the rollers and the other half on the other roller, by means of drive motors that are fitted to the ends of these rollers.

The spool carrier is mounted on the support in a way so that it is dismountable, by means of a parallel kinematics. The said spool carrier can therefore be replaced, enabling there to be several spool carriers loaded with spools of different strips, for application of the one desired in each circumstance depending of the application in question, which simplifies the work to be undertaken with the head.

Each spool carrier is capable of holding a large number of spools for supplying strips, corresponding to the respective passage of the strips through the feed port, which makes for high head performance in strip application. For example, and without this being a limitation in any way, a practical case is foreseen with a distribution of 36 spools of strips on each spool carrier, corresponding to the passage of 36 strips through the feed port.

It is envisaged that the spool-carrier is mounted on a moving support that is longitudinally displaceable, being adjustable so that it can work in any direction, upon a stationary or revolving plane, which permits the production of flat, curved or rotating pieces, with no conditioning whatsoever.

Furthermore, the use of multiple strips for simultaneous application allows for the use of narrow width strips to cover an application width equal to or greater than that involving conventional heads, with the spools carrying the strips being much smaller; therefore, the possibilities for handling are more advantageous, insofar as a large number of spools supplies a quantity of material for application that greatly reduces the consumption of each spool, which therefore last a long time, thus reducing the need to replace them.

The head contemplated by this invention does therefore provide clearly advantageous features which make it unique and give it preference over existing heads used for the same function.

FIG. 1 presents a perspective view of the head in question, mounted on a support that can move in various directions;

Figure 12:
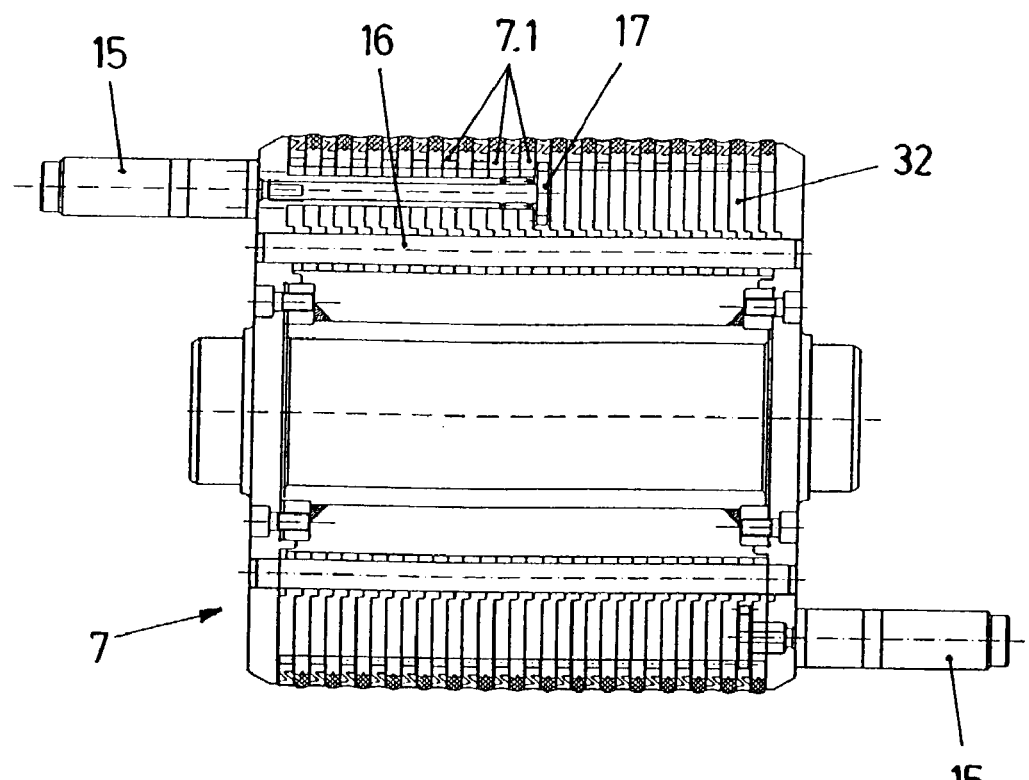
Figure 13:
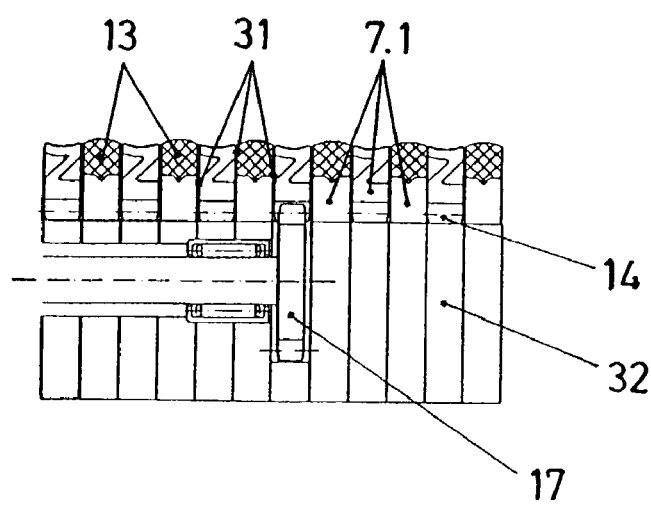

FIG. 12 provides a sectional view of a practical embodiment of a drag roller for the strips in accordance with another possible manner of construction; and FIG. 13 is an enlarged detail of the roller in the previous figure.

The invention refers to a head designed to form laminated pieces of the material called "composite", by means of the application of strips made up of said material, which may be carbon fibre, fibreglass, or of any other similar kind of fibre.

The head comprises a spool carrier (1) on which a plurality of spools are attached (2) as suppliers of the strips (3) that are to be applied, which are fed separately to the application area (4), where they are arranged in a collateral distribution with their corresponding edges abutting, to determine a band of application equal to the sum of the widths of the strips (3) which coincide in the application.

Upstream the application area (4) there is a feed port, in which the strips (3) are gathered and channelled, being arranged in a suitable distribution for application; at the same time, they are individually driven for supply to the application.

The feed port comprises two guide combs (5 and 6), between which two parallel rollers (7 and 8) are fitted which form a drive assembly for feeding the strips into the application area (4).

The combs (5 and 6) feature a series of curved grooves through which the strips (3) pass, transversally adopting a curved shape in accordance with the aforementioned grooves, in such a way that at this stage the strips (3) are collaterally arranged in a position correlative to their widths, yet without their edges touching, given the curved transversal shape.

In the aforementioned combs (5 and 6), the corresponding grooves define, at least in the case of the inlet, a conic configuration, in order to facilitate the insertion of the strips (3) and the threading of the same towards the application area (4).

Figure 4:
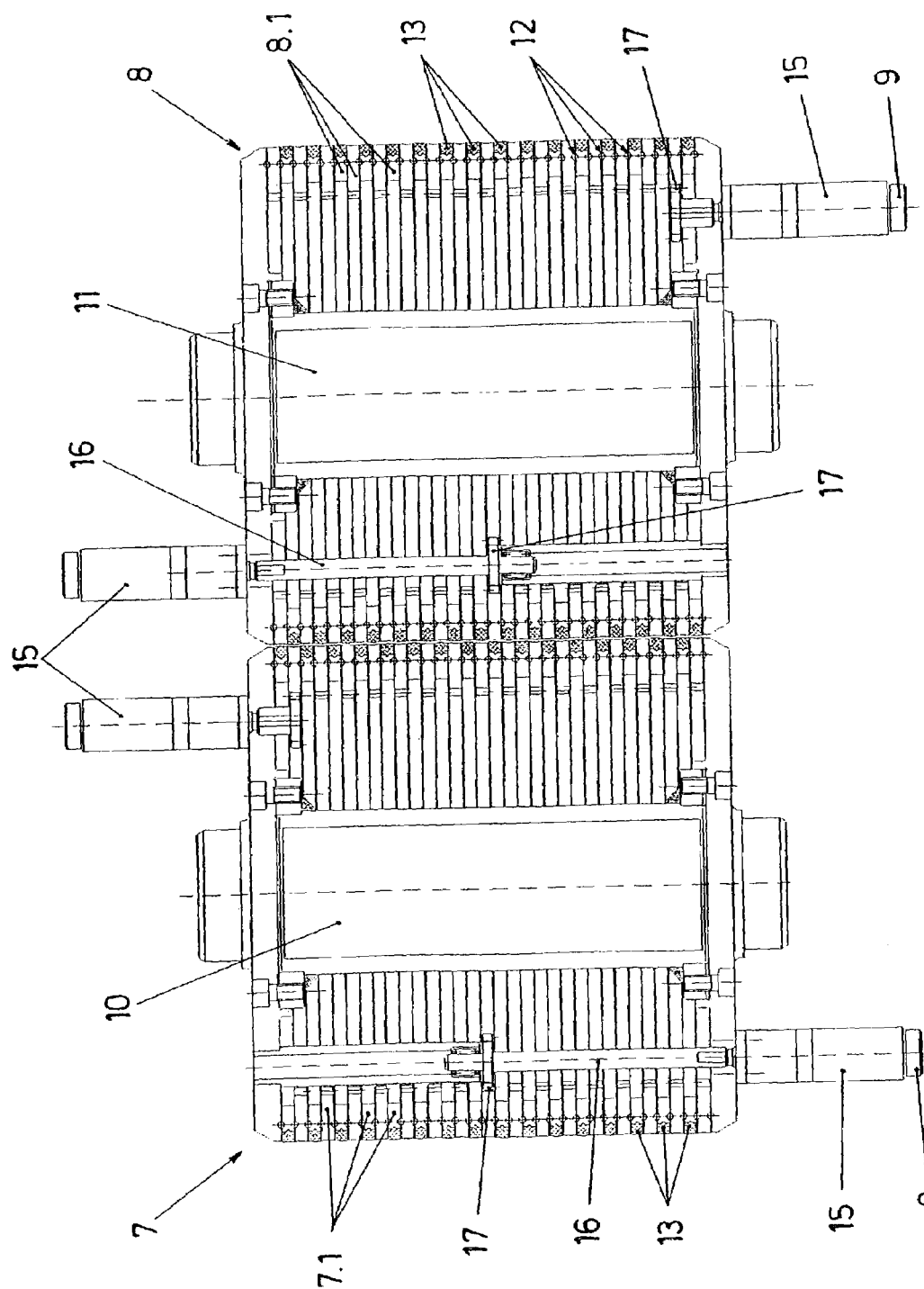
FIG. 4 is a simplified sectional view of the set of drag rollers for the strips in the feed port of the head.

The drag rollers (7 and 8) consist of a respective cluster of washers (7.1 and 8.1), each mounted on their respective shafts (10 and 11), as depicted in FIG. 4.

Figure 5:
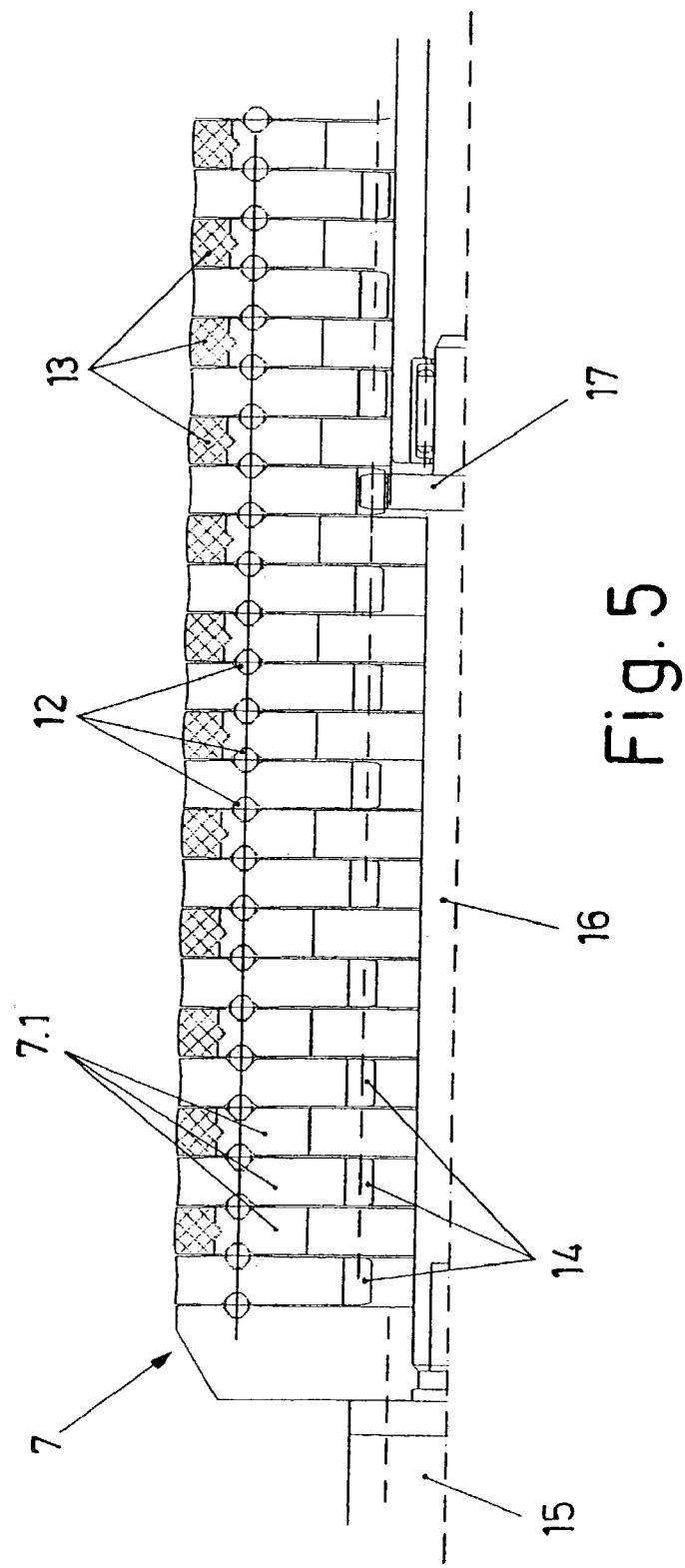
FIG. 5 is a partial enlarged section of one of said rollers in the feed port.
Figure 6:
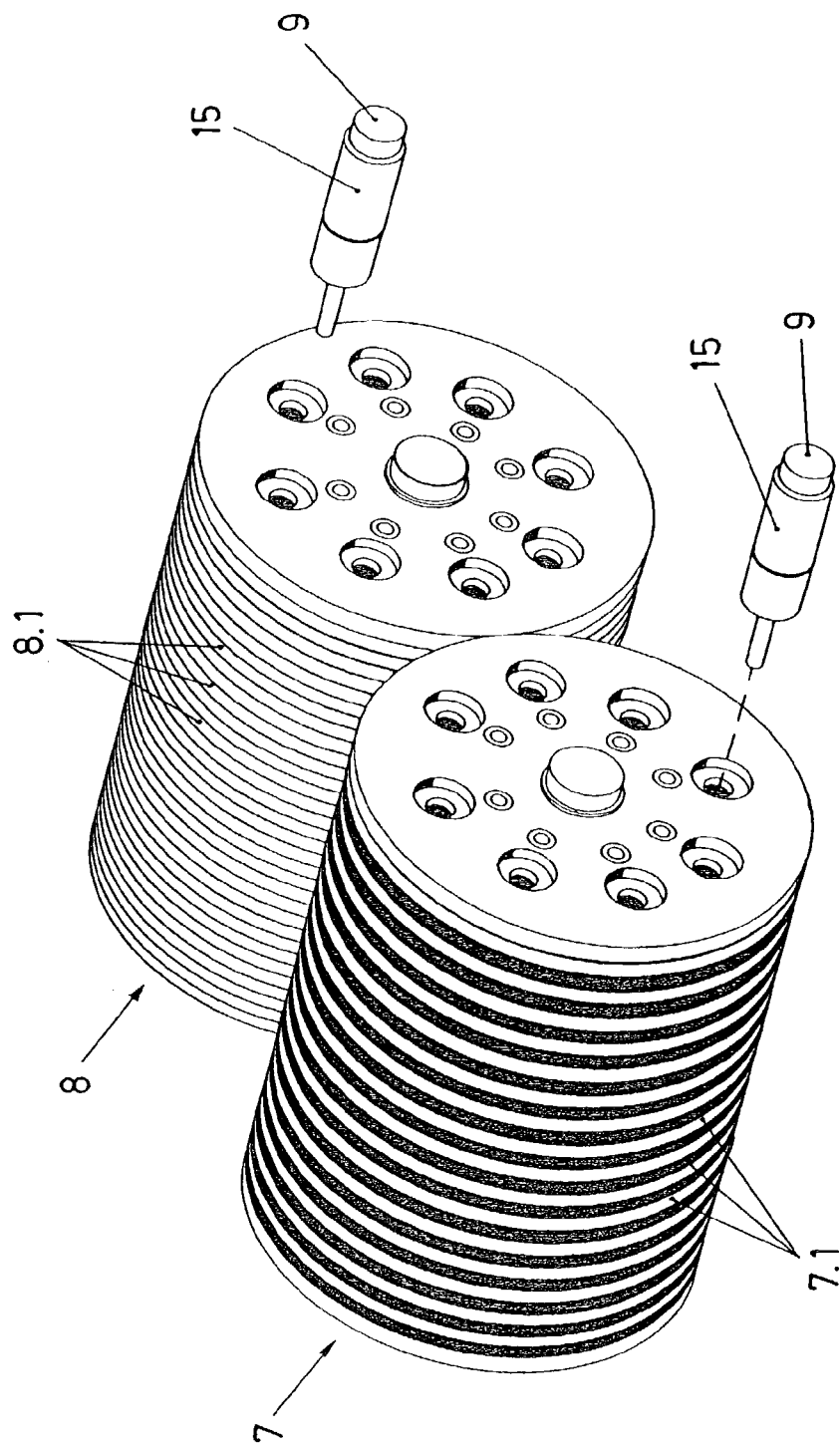
FIG. 6 is a perspective view of the set of the aforementioned drag rollers for the strips, with regard to which only two drive motors for the washers have been featured, with the motors positioned facing their points of connection.
Figure 7:
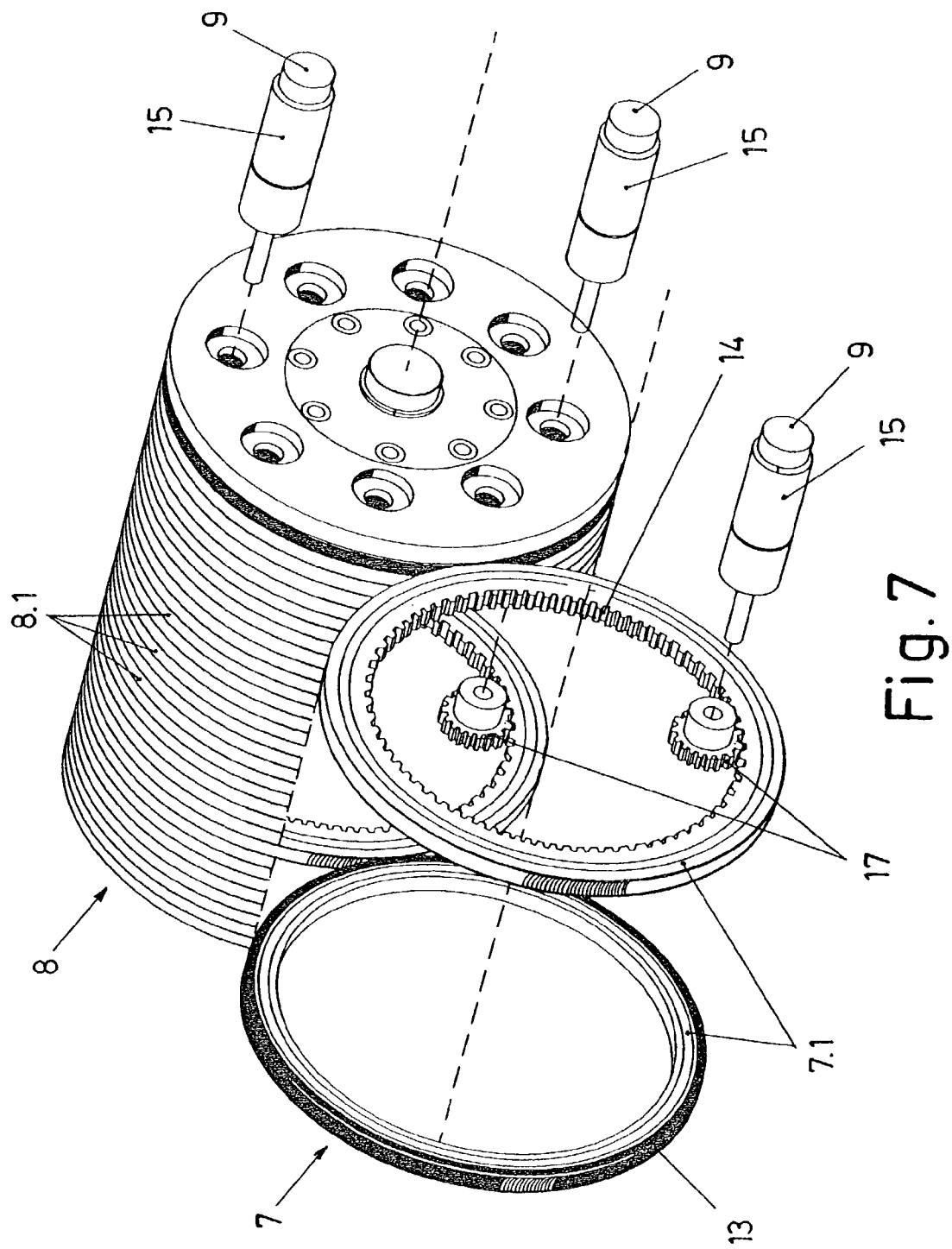
FIG. 7 is the same perspective view as the preceding one, with one of the rollers schematically depicted with only two washers, with a view of the interior.
Figure 8:
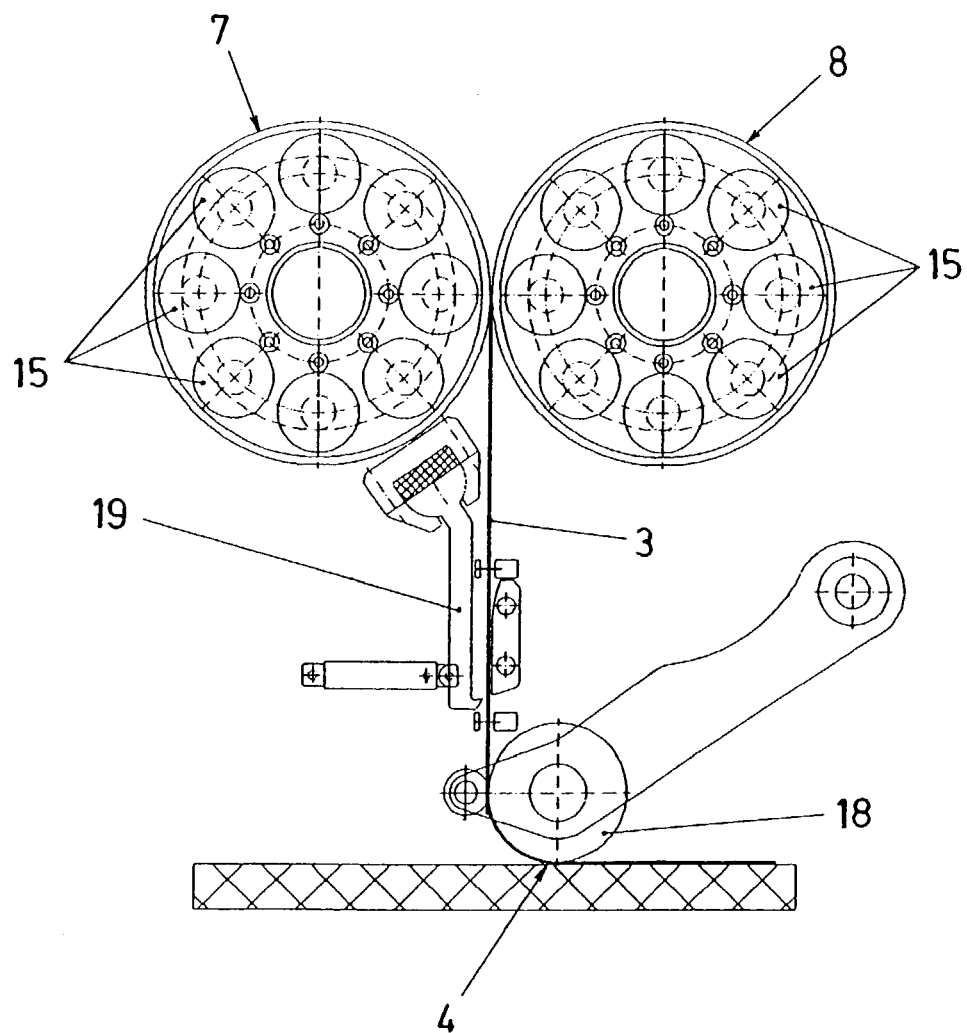
FIG. 8 is an enlarged detail of the part of the head that corresponds to the area of application of the strips.
Figure 8A:
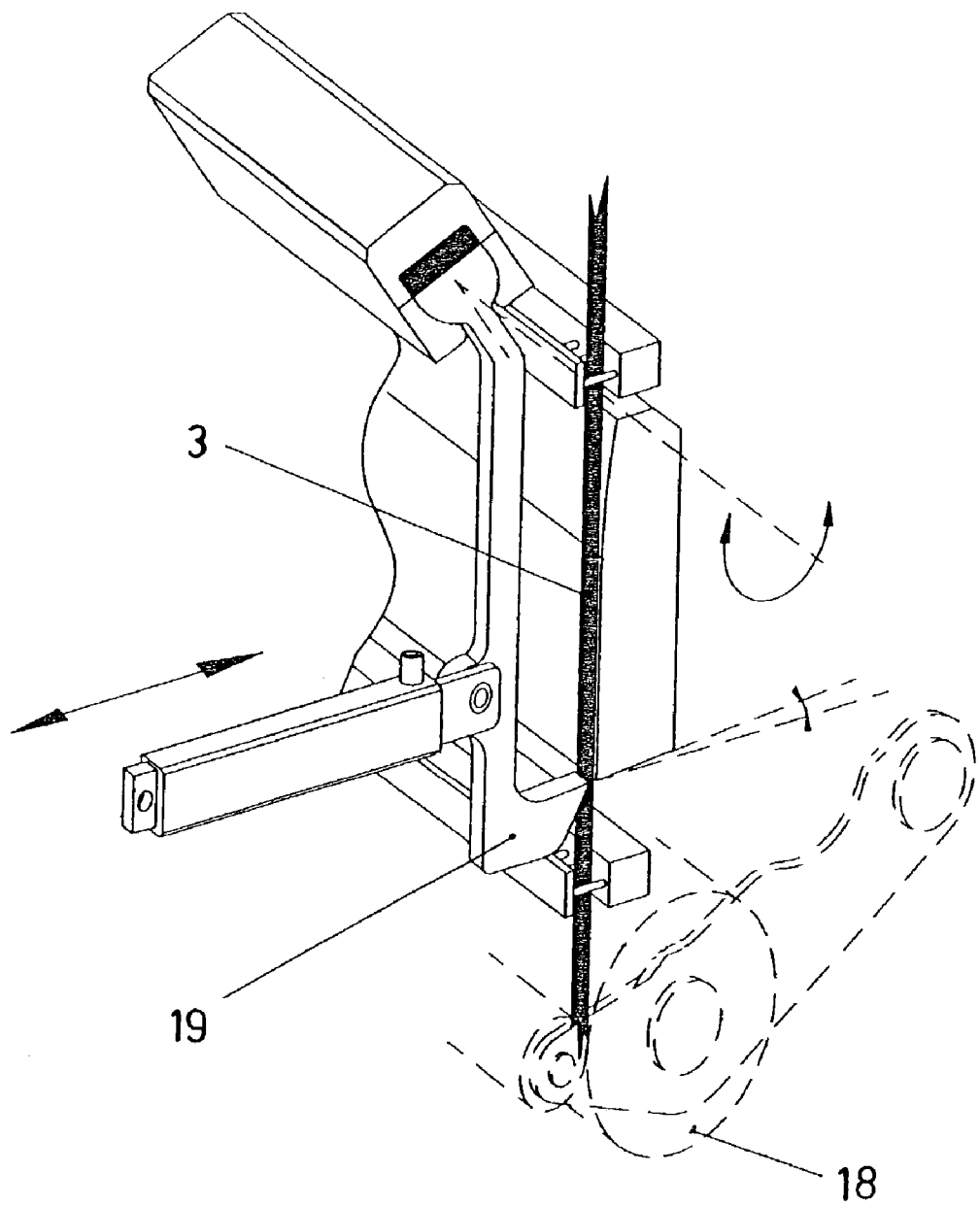
FIG. 8A is an enlarged detail in perspective of the apparatus for cutting the strips.

Between the washers (7.1), as well as between the washers (8.1), there are balls (12) included that are lodged in corresponding facing annular grooves in the adjacent washers, as shown in FIG. 5, whereby the cluster of the washers (7.1) and the cluster of the washers (8.1) form in their respective sets an assembly block in the manner of bearings, on the corresponding shafts (10 and 11), with each washer (7.1) and each washer (8.1) rotating independently of the rest.

In the parallel arrangement of the rollers (7 and 8) in the assembly, their washers (7.1 and 8.1) are correspondingly facing each other on the edge, where some determine a concave transversal shape and the others a reciprocal convex shape, according to the same curved shape of the grooves of the combs (5 and 6).

According to a preferential embodiment (FIGS. 4 to 7), it is envisaged that for each roller (7 and 8) the respective washers (7.1 and 8.1) shall be alternatively of concave edge and of convex edge, being those of concave edge of a hard material, such as steel, whereas those of convex edge shall feature on the edge area a softer material (13), such as plastic, or similar.

In the facing assemblies of washers (7.1 and 8.1), one is driven and the other drives, in each case, with the one of concave edge preferentially being the drive and the one of convex edge the driven washer, although this is not restrictive, as the arrangement of operation could be the other way round.

The washers (7.1 and 8.1) designed to drive, feature a toothed edge (14) on their inner part, by means of which they are driven by the corresponding motor (15) by means of a shaft (16) and a pinion (17).

For this purpose, at each end of the rollers (7 and 8) a number of motors (15) are attached equivalent to half the drive washers of the respective set, in a manner that between the motors (15) attached to both ends of each one of the rollers (7 and 8), drive may be applied to a large number of pairs of facing washers (7.1–8.1), for feeding the same number of strips (3), which are driven through the combs (5 and 6) towards the application area (4).

The strips (3) are fed from their respective spools (2) independently fitted on the spool-carrier (1), in such a manner that the number of spools (2) should be the same as the number of strips (3) ready to be fed through the combs (5 and 6) and between the rollers (7 and 8); with provision made for, although not restricted to, an embodiment for the application of 32 strips (3), in other words 32 spools (2), which are arranged along both sides of the spool carrier (1), with each one of the rollers (7 and 8) incorporating 8 motors (15) at each end, for providing drive for 32 drive groups consisting of the respective pairs of facing washers (7.1 and 8.1).

The application area (4) of the strips (3) is equipped with a pinch roller (18) by means of which the strips (3) are applied by pressing them onto the surface of application, in a manner that upon effecting said pressure of application, the strips (3) take on a flat transversal shape, whereby the adjacent edges of the same come into contact with each other, with all the strips (3) thus forming a band of application.

The operation of the motors (15) is electronically controlled by means of computer software, for which purpose each motor (15) is fitted with an encoder (9), meaning that the individual drive of each strip (3) in its passage through the rollers (7 and 8) enables the supply of each strip (3) to be activated and halted as required, with the possibility of covering surfaces according to the shape of the same, with a minimum wastage of material. The assembly couplings of the spools (2) are fitted with an electromagnetic brake, for halting as appropriate when the feed of the corresponding strips (3) is stopped.

Between the feed port and the application area (4) there is a cutting device (19) by means of which, and likewise controlled by the software application, the strips (3) are cut as appropriate at the end of each application pass, or in intermediate stretches that are not to receive application, enabling pieces to be made with gaps or windows in a continuous operating process and with a minimum wastage of material.

The strips (3) designed for the application are provided with an impregnation of adhesive in order for the layers of application to be suitably bonded to each other, with said strips (3) incorporating a protective strip of paper, which is to be removed from said strips (3) for the application of the same, with inclusion accordingly on the spool carrier (1) of accessory spools (20), which collect the respective strips of paper as the strips (3) are fed off the corresponding supply spools (2).

Figure 1:
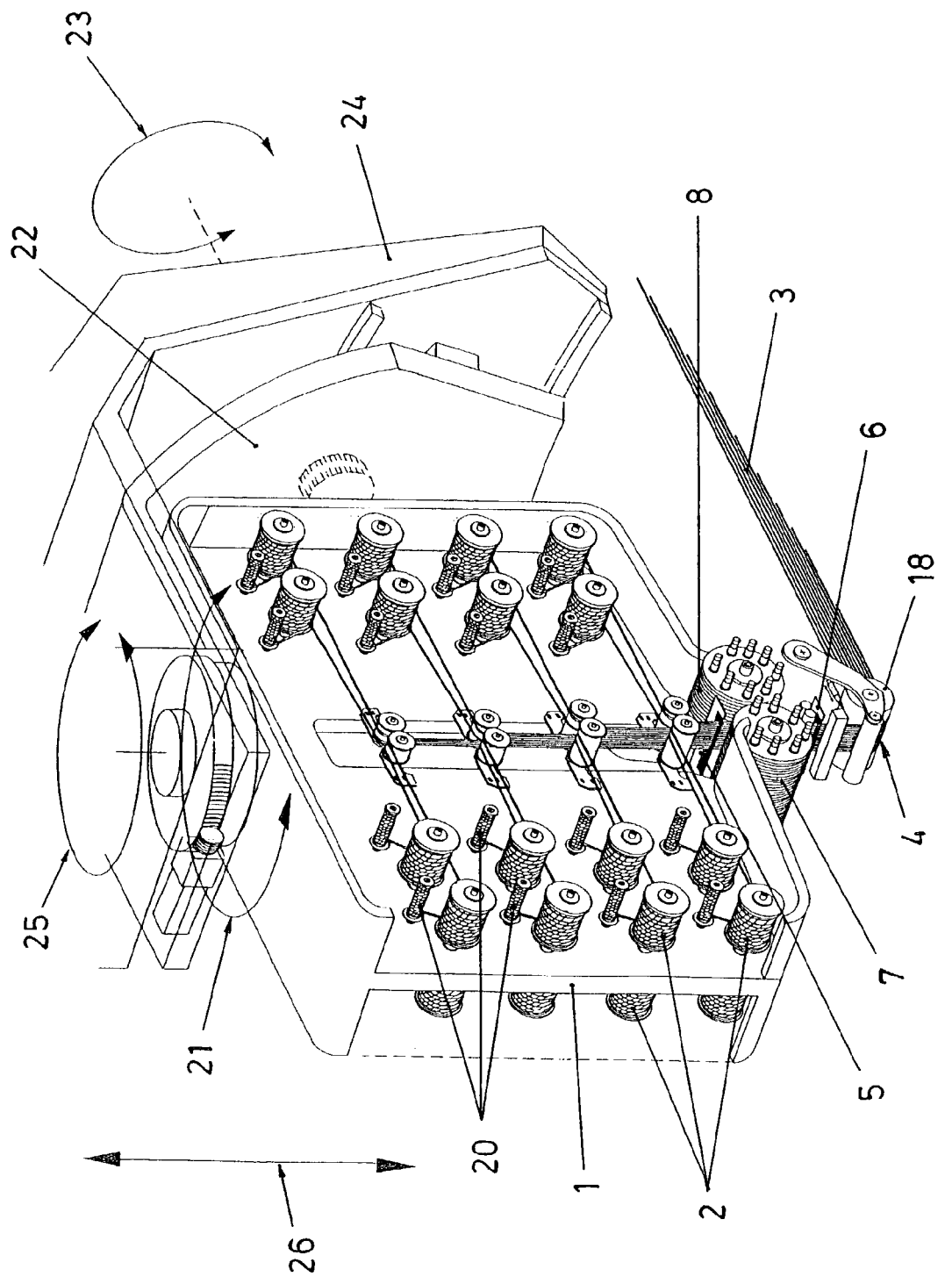
Figure 2:
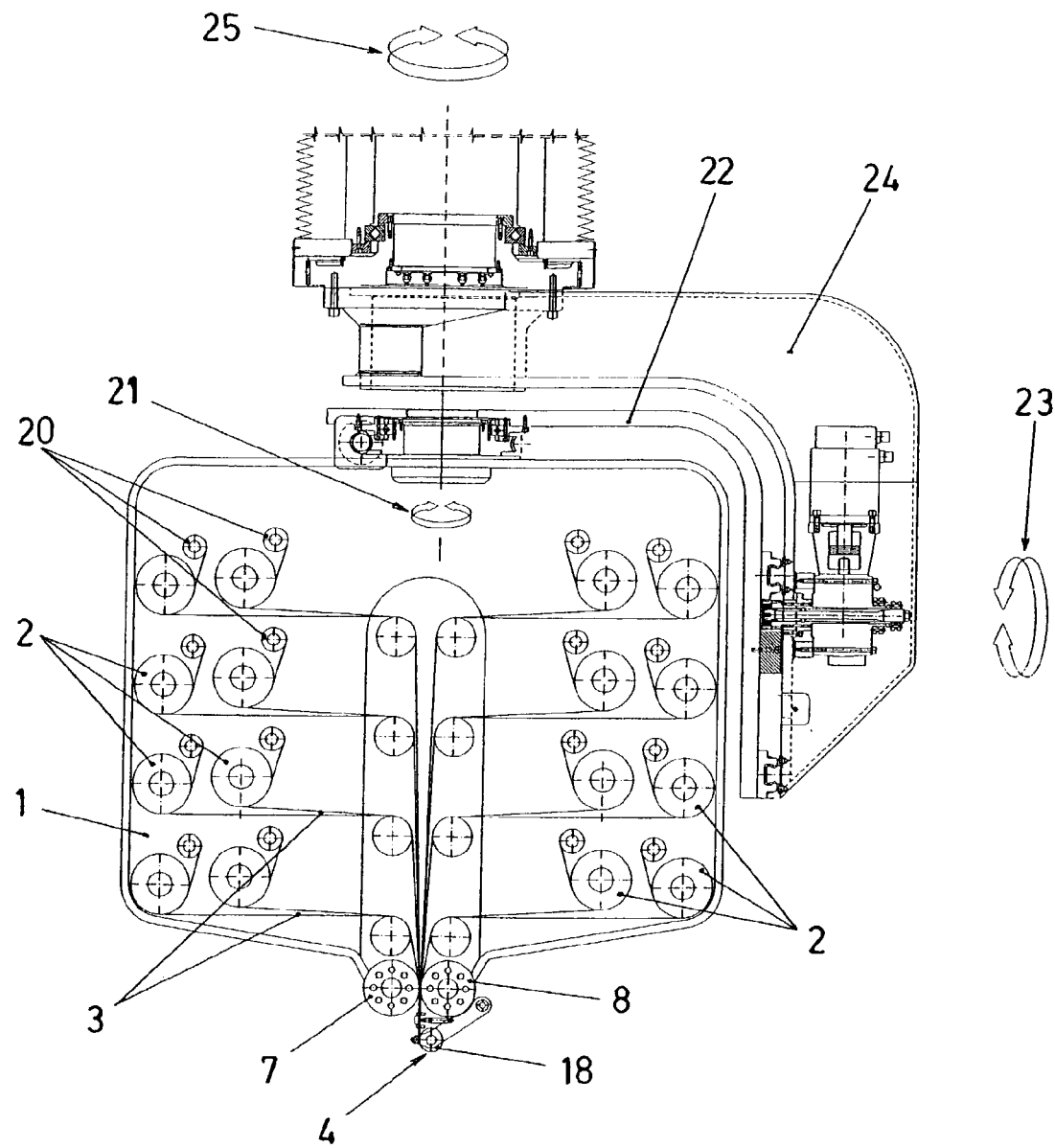
FIG. 2 is a front view of the head from the previous figure.
Figure 3:
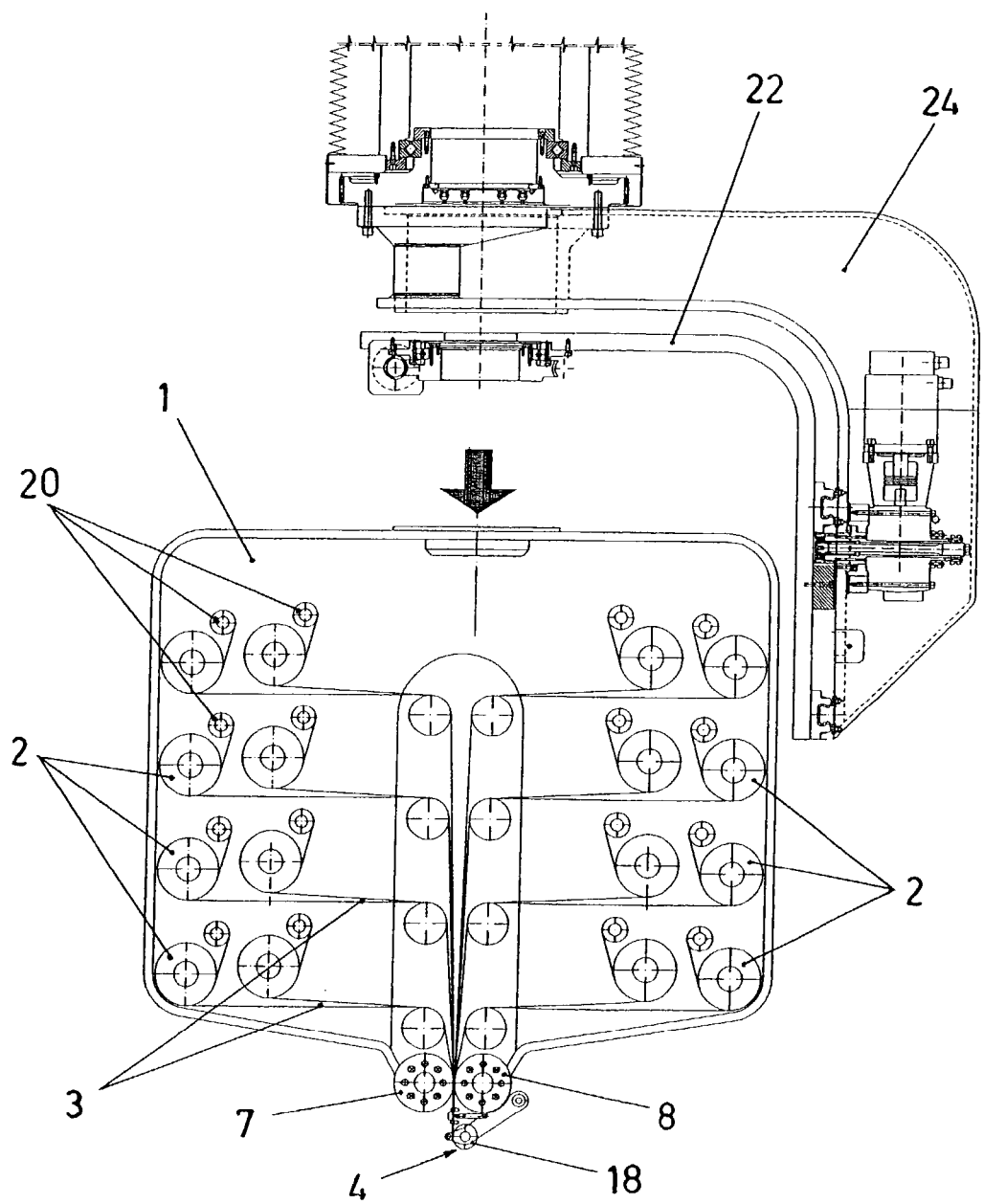
FIG. 3 is a similar view to the preceding one, with the spool carrier removed from the support.

The spool carrier (1) may used with any kind of support for the application of the strips (3), for example, as is shown in FIGS. 1 to 3, in a rotating assembly (21) with respect to a support (22) which in turn is attached by means of a rotating coupling (23) to another support (24) which is attached by means of a rotating joint (25) with vertical movement (26) to a displaceable carrier means. In this way the head is able to move in all directions, enabling the application of the strips (3) in any direction.

Figure 9:
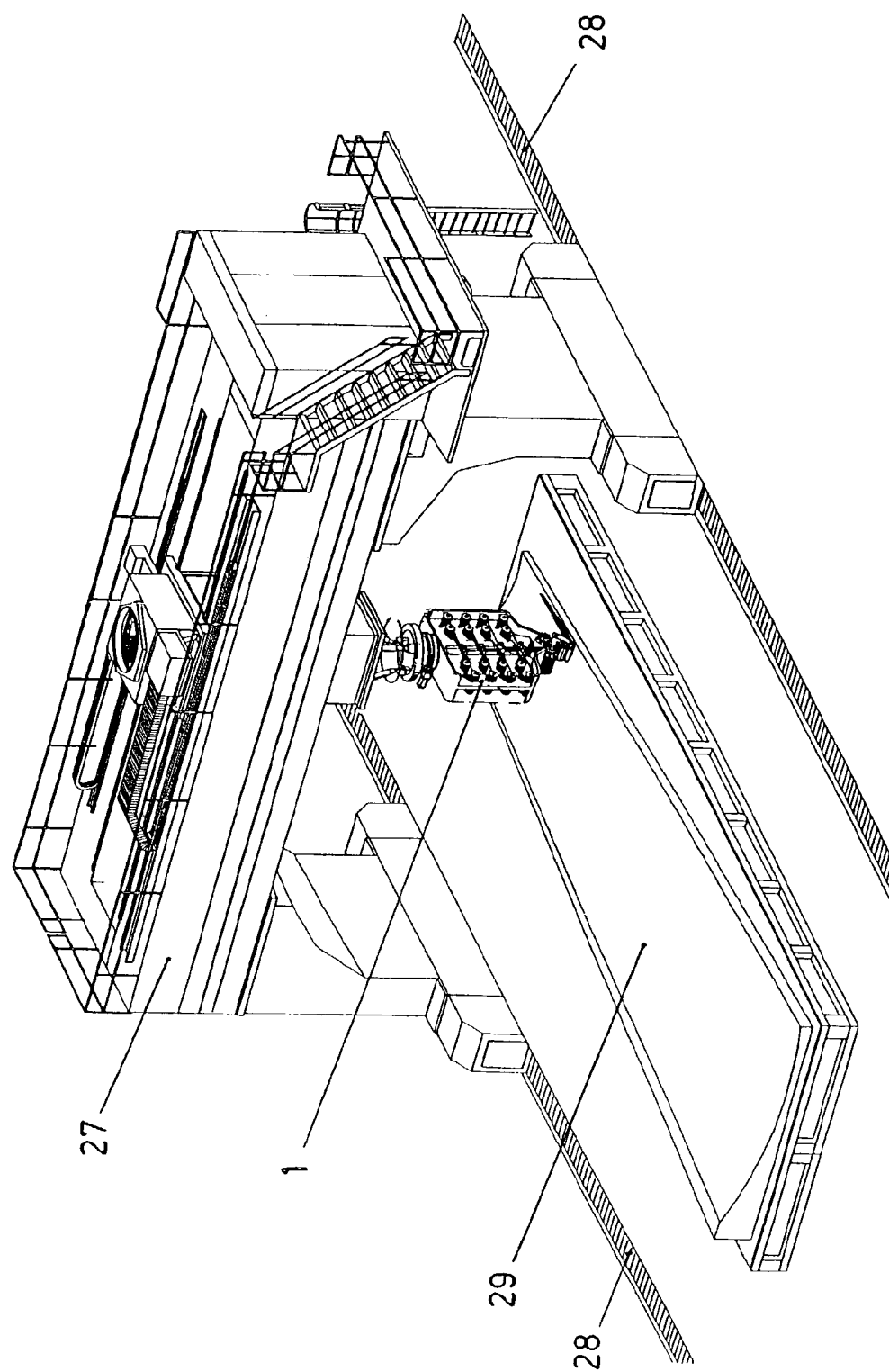
FIG. 9 is a perspective view of an example of application of the head, mounted on a gantry-support for working on a stationary piece.
Figure 10:
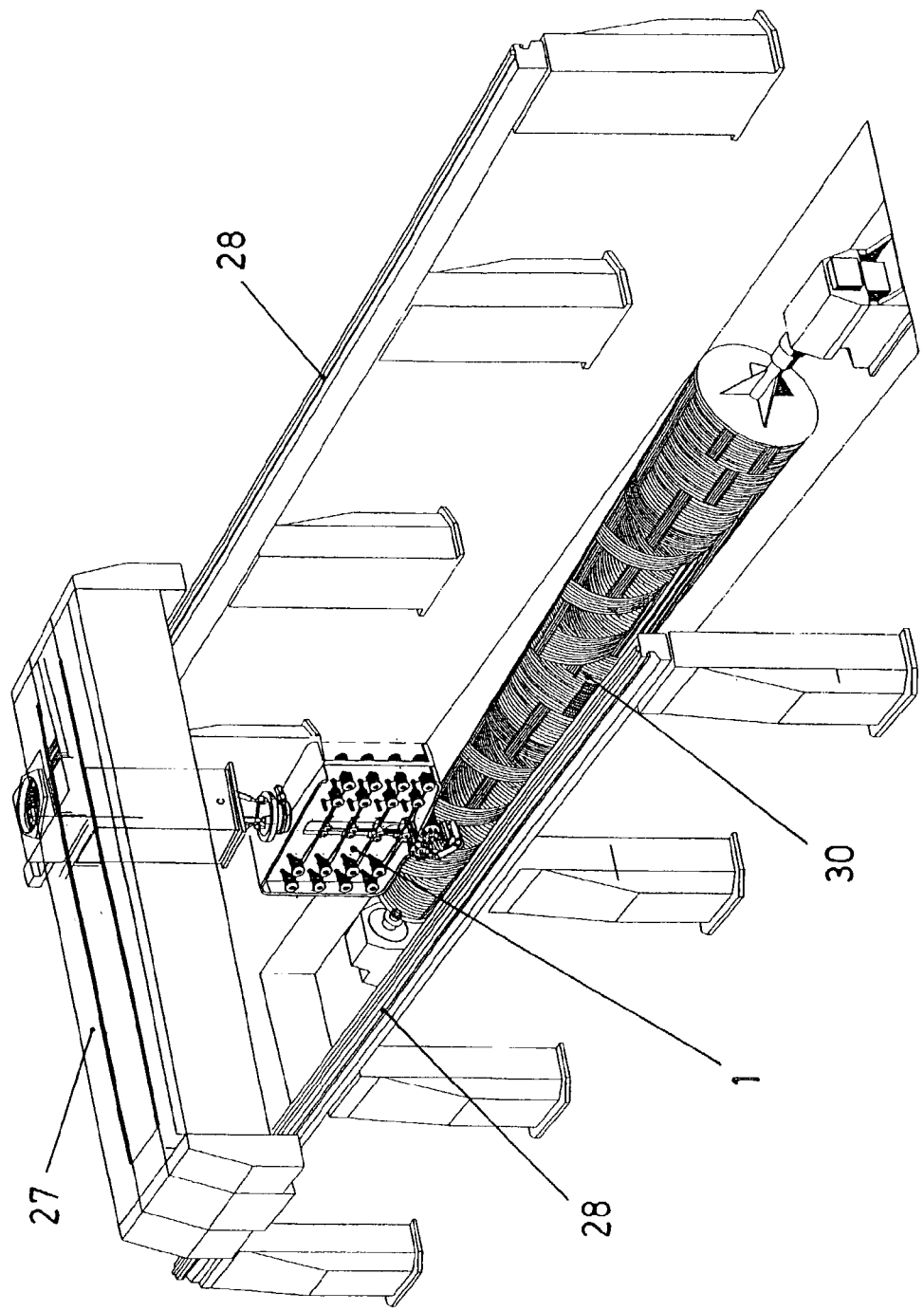
FIG. 10 is a perspective view of an example of application of the head, mounted on a gantry-support for working on a rotating cylindrical piece.
Figure 11:
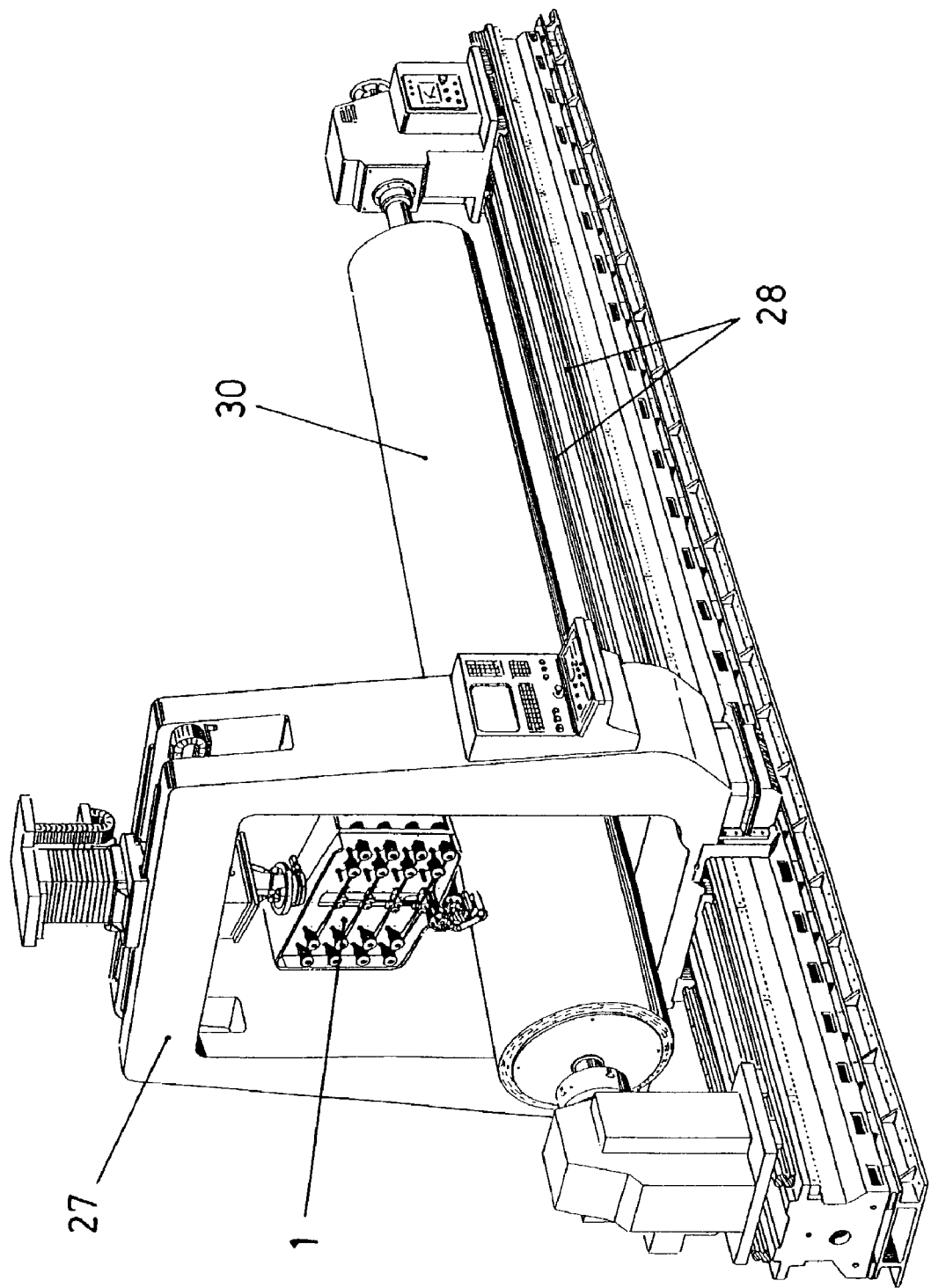
FIG. 11 is a perspective view of another example of application of the head for working on a rotating cylindrical piece.

The head (1) may, nonetheless, be mounted on carrier devices of any other kind, for example, as shown in FIGS. 9, 10 and 11, in attachment to a gantry-support (27), of any shape, and which moves on guides (28), enabling the application of the strips in relation to a stationary surface, for the construction of flat or curved pieces (29), as shown in FIG. 9, or on surfaces arranged in a rotary assembly, for the construction of rotating pieces (30), as in FIGS. 10 and 11.

The spool carrier (1) is mounted in any case by means of a dismountable coupling, to the carrier means, being removable, as shown in FIG. 3, and enabling easy replacement, which is extremely useful in practice, as a number of spool carriers (1) can be kept loaded with spools (2) of different types of strips (3) permitting the one suited to each case to be applied depending on the appropriate task to be performed, without having to change the spools (2) on the spool carrier (1) installed.

Within the same approach to the composition of a cluster of independently rotating washers, the formation of the rollers (7 and 8) may also involve all the washers (7.1 or 8.1) being made of plastic, in accordance with an arrangement such as that of FIGS. 12 and 13, for the roller for example (7), amongst whose plastic washers (7.1) inclusion is made in this case of respective steel bands (31), to enhance friction in the individual rotation of the aforementioned washers (7.1), with these arranged on a segmented support shaft (32), of ground and burnished steel, upon which the radial position of each washer (7.1) is maintained unvaried; the washers slide with their inner edge on the periphery of said segmented shaft (32), with this having in the segments that correspond to the drive washers (7.1), a window for the passage of the respective drive pinion (17) to the inner toothed edge (14) of the corresponding washer (7.1).

In all other aspects, this arrangement of the rollers (7 and 8) is in keeping with the same characteristics of the embodiment of FIGS. 4 to 7, even including a periphery of elastomeric material (13) on the washers with transversely convex edges.

What is claimed is:

1. Multi-application head for fibre strips, that comprises means for feeding the strips (3) that are driven into an application area (4), in which said strips (3) are pressed down by means of a roller (18) against the corresponding surface of application, wherein the multi-application head comprises:
    a spool carrier (1), in which a plurality of spools (2) are included for feeding the strips (3), which are fed separately into the vicinity of the application area (4);
    the multi-application head including a feed port through which the strips (3) are fed and passed through;
    the feed port being fitted with channeling means for distributing the strips (3) for their application in a width formed by the sum of all of them; and
    said feed port further including means for feeding the strips (3) into the application area (4),
    wherein the means for feeding the strips (3) into the application area (4) includes:
        guide combs (5 and 6), which form curved grooves in collateral distribution, through which the strips (3) pass through and therein adopt a curved transversal shape, with adjacent edges slightly separated from one another, for the lateral bonding of said strips (3) as they adopt a flat transversal shape when they are pressed onto the surface of application, and
    wherein the means for feeding the strips (3) into the application area (4) includes:
        two adjacent rollers (7 and 8) in parallel having respective clusters of washers (7.1 and 8.1), which feature facing edges in correspondence with the curvature of the grooves of the guide combs (5 and 6), with said facing edges of the washers (7.1 and 8.1) defining respective passages through which the strips (3) pass.

2. The multi-application head for fibre strips according to claim 1, wherein the cluster of the washers (7.1) and the cluster of the washers (8.1) are arranged in separate assembly blocks on the corresponding shafts (10 and 11), with the inclusion of balls (12) between the adjacent washers in both blocks, which enable each washer (7.1) and each washer (8.1) to rotate independently of the others about the relevant shafts (10 and 11).

3. The multi-application head for fibre strips according to claim 1, wherein the cluster of the washers (7.1) and the cluster of the washers (8.1) are arranged in respective assembly blocks, being all made of plastic material, with intermediate inclusion of steel bands (31) to enhance friction, with the assembly of these washers (7.1) and (8.1) mounted on a segmented shaft (32) of ground and burnished steel, on which the washers (7.1 and 8.1) rotate along their inside edge, with no change to the radial position of the same.

4. The multi-application head for fibre strips, according to claim 1, wherein the washers (7.1 and 8.1) whose edges are facing each other, are arranged with one being a drive washer and the other being a driven washer, with the drive washers being acted upon by corresponding motors (15) fitted to ends of the respective rollers (7 and 8), from which motors (15), a drive is established by means of a shaft (16) and of a pinion (17) to a toothed area (14) in an inner edge of the corresponding drive washer (7.1 or 8.1) in each case.

5. The multi-application head for fibre strips according to claim 4, wherein each pair of facing washers (7.1 and 8.1), defines between their edges an individual feed passage for a strip (3), in such a manner that the drive of the various strips (3) is independent, with individual control of the feed of each one of them into the application area (4), by means of the corresponding motors (15).

6. The multi-application head for fibre strips according to claim 5, wherein one of the facing washers (7.1 and 8.1) reciprocally defines a transversally concave edge and the other corresponding facing washer defines a transversally convex edge, with the one with the transversally concave edge being the drive washer, and that the other with the transversally convex edge, operating as the driven washer and being made of a softer material (15) in its periphery.

7. The multi-application head for fibre strips according to claim 1, wherein the spool carrier (1) is attached to a moveable support in such a way that it is dismountable for facilitating the replacement of said spool carrier (1) with another loaded with spools (2) of strips (3) of another kind.

* * * * *